(No Model.) 2 Sheets—Sheet 1.

J. BLUE.
FERTILIZER DISTRIBUTER AND COTTON PLANTER.

No. 507,985. Patented Nov. 7, 1893.

Witnesses
F. M. Johnson
W. S. Duvall

Inventor
John Blue
By his Attorneys,
C. A. Snow & Co.

THE NATIONAL LITHOGRAPHING COMPANY,
WASHINGTON, D. C.

(No Model.) 2 Sheets—Sheet 2.
J. BLUE.
FERTILIZER DISTRIBUTER AND COTTON PLANTER.
No. 507,985. Patented Nov. 7, 1893.
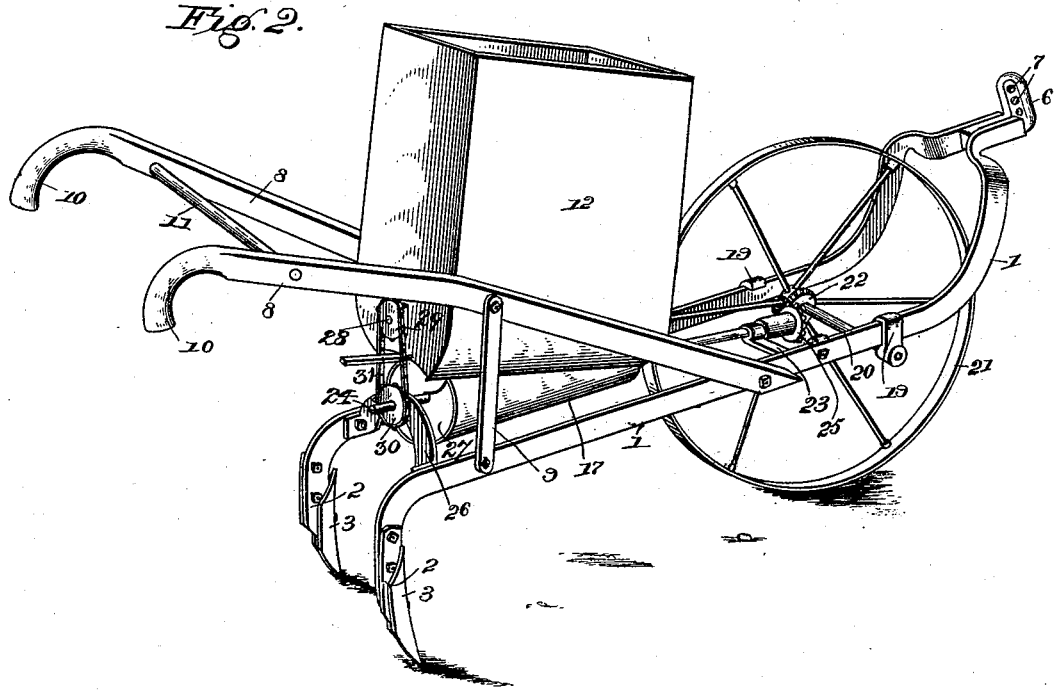
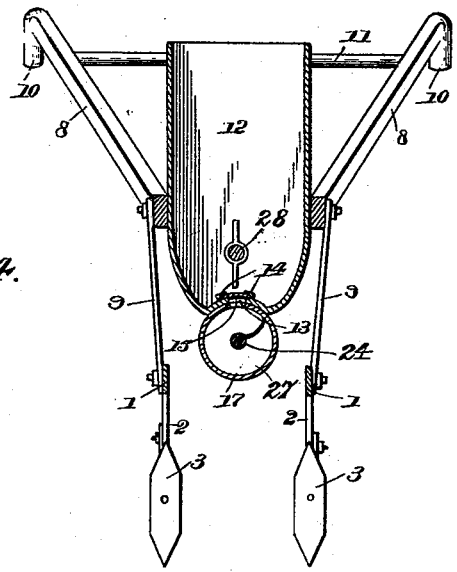
Witnesses
F. M. Johnson
W. F. Duvall
Inventor
John Blue
By his Attorneys,
C. A. Snow & Co.

UNITED STATES PATENT OFFICE.

JOHN BLUE, OF LAURINBURG, NORTH CAROLINA, ASSIGNOR OF ONE-HALF TO ANGUS BLUE, OF SAME PLACE.

FERTILIZER-DISTRIBUTER AND COTTON-PLANTER.

SPECIFICATION forming part of Letters Patent No. 507,985, dated November 7, 1893.

Application filed June 26, 1893. Serial No. 478,884. (No model.)

*To all whom it may concern:*

Be it known that I, JOHN BLUE, a citizen of the United States, residing at Laurinburg, in the county of Richmond and State of North Carolina, have invented a new and useful Fertilizer-Distributer and Cotton-Planter, of which the following is a specification.

My invention relates to improvements in fertilizer distributers; and the objects in view are to provide a machine of cheap and simple construction; that is durable and adapted to evenly and in predetermined quantities distribute fertilizer and cover the same thereafter, and to secure such even distribution regardless of any small quantity to which the machine may be adjusted for discharging; and finally to so construct the machine as to adapt it to serve as an efficient cotton planter when so desired.

With these and other objects in view the invention consists in certain features of construction hereinafter specified and particularly pointed out in the claims.

Figure 1:
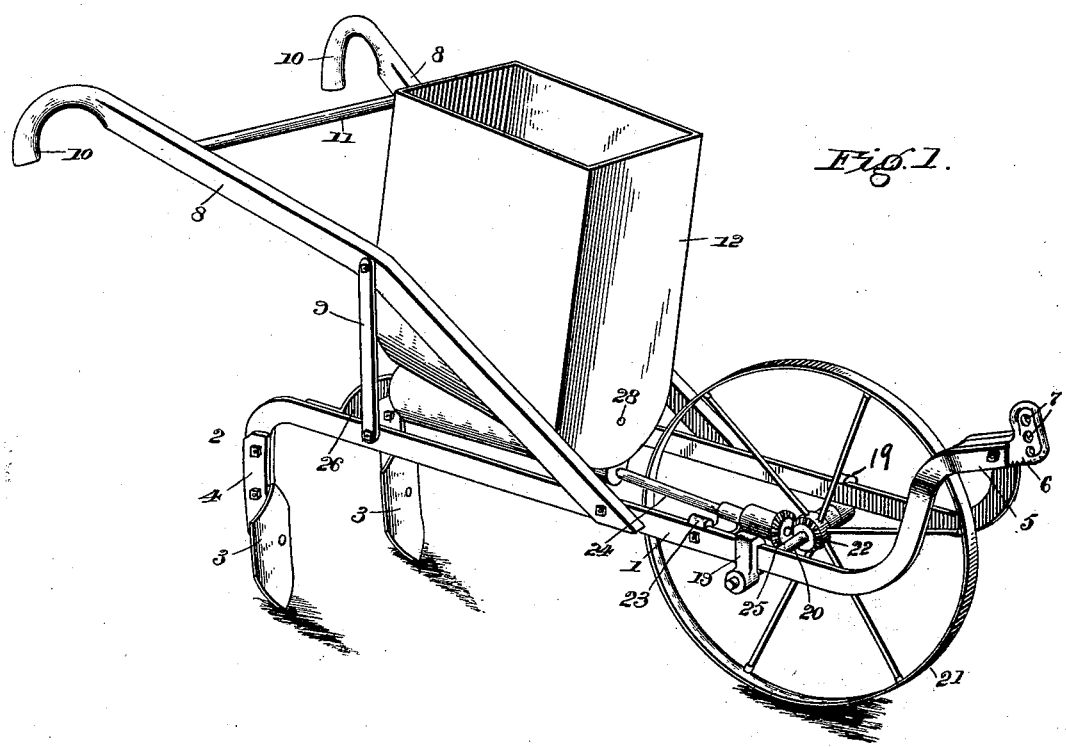
Figure 3:
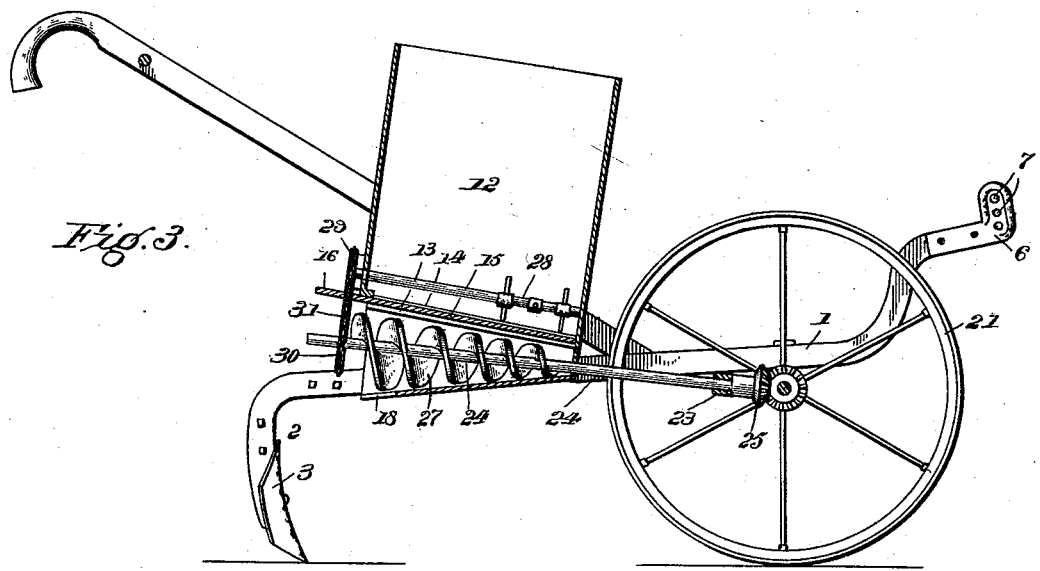

Referring to the drawings:—Figure 1 is a front perspective view of a machine embodying my invention. Fig. 2 is a partial rear perspective. Fig. 3 is a vertical longitudinal sectional view. Fig. 4 is a transverse sectional view.

Like numerals of reference indicate like parts in all the figures of the drawings.

In carrying out my invention I employ a pair of opposite metallic side beams 1, the same having their rear ends downwardly bent to form goose-neck standards 2, to which shovel-carrying feet 3 are in this instance bolted, the said feet carrying reversible shanks 4 of the ordinary pattern. The beams toward their front ends are upwardly and inwardly disposed, meeting at the longitudinal center of the machine and being forwardly extended, form clamping arms 5, which fit in grooves in the opposite sides of a clevis-plate 6, the front end of the latter being provided with a vertical series of clevis holes 7, bolts being employed to secure the plate to said arms. Bolted to intermediate points of the beams is a pair of handle-bars 8 which are braced by means of vertical braces 9. The handle-bars are parallel to the point of connection with the braces and beyond this point diverge, as shown, and terminate in handles 10 in advance of which they are connected by the usual transverse rung 11. A hopper 12 is seated between the parallel portions of the handle-bars. The hopper bottom is rounded and provided with a longitudinal slot 13 at opposite sides of which parallel ways 14 are formed, the same corresponding with an opening formed in the rear end of the hopper. In these ways there is mounted a slide or cut-off 15, the same having a reduced end or handle 16 that projects through the slot in the rear wall of the hopper. A conical or tapered discharge passage 17 is located under the slot in the bottom of the hopper, the larger end of said discharge passage being at the rear and below the hopper and provided upon its under side with a V-shaped opening 18. This conical discharge has an opening in its upper side that agrees with the slot in the bottom of the hopper and is covered by the sliding cut-off in the same manner as is said slot in the bottom of the hopper. A pair of hanger bearings 19 are secured to the beams 1 immediately in rear of their front curved ends, and in the same there is journaled a transverse axle 20 upon which is mounted a ground-wheel 21 located at one side of the center of the axle and also a beveled or miter gear 22. A journal bracket 23 is located in rear of the axle and is bolted to one of the beams 1, and in said bracket and a bearing in the front end of the discharge passage there is located a feed-shaft 24, whose front end is provided with a beveled or miter gear 25 that engages with that of the axle and receives motion therefrom. A transverse yoke-bar 26 connects the beams 1 in rear of the discharge passage, and in said bar the rear end of said feed-shaft is also journaled. Within the passage there is located upon the shaft a spiral feed-screw 27, which is tapered in conformity with the passage and adapted to convey fertilizer from the front end of the passage to the V-shaped opening, in the rear bottom side thereof. The hopper it will be seen is inclined so that the fertilizer contained therein is constantly fed toward the front end thereof.

In bearings formed in the front and rear ends of the hopper an agitator-shaft 28 is journaled, the rear end of said shaft projecting beyond the back wall of the hopper and there provided with a sprocket-wheel 29. A corresponding sprocket-wheel 30 is located upon the rear end of the feed-shaft, and these two wheels are connected by an endless sprocket-chain 31, whereby motion is conveyed from the feed-shaft to the agitator shaft of the hopper.

This completes the construction of the hopper, and the operation of the same is as follows:—A fertilizer agent of any desired character is placed in the hopper, and the machine drawn along the field to be fertilized. The ground wheel and the axle in their revolutions, through the medium of the miter gears, convey motion to the feed-shaft which operates the feed-screw, and this shaft in turn, through the medium of the sprocket chain and wheels conveys motion to the agitator shaft in the hopper, so as a result the fertilizer agent within the hopper is kept constantly stirred up and fed toward the opening in the bottom thereof and prevented from choking, and after it passes into the discharge passage it is fed continuously and evenly through the same to the V-shaped opening in the discharge end thereof. It will be obvious that through the medium of the sliding cut-off the out-put or amount of fertilizer discharged per acre may be regulated to a nicety, and that by reason of the tapered passage and V-shaped slot therein, such fertilizer, regardless of the smallness of the amount, is fed uniformly and continuously, which would not be the case were it not for the presence of the V-shaped opening, but to the contrary, when a small amount is being discharged it would be dropped in hills or deposits one every revolution of the feed-screw. The tapered passage, it will be seen, obviates any difficulty in the way of clogging, so that a free feeding of the fertilizer always takes place.

Having described my invention, what I claim is—

1. In a fertilizer distributer, the combination with the opposite beams terminating at their rear ends in plow standards and having their front ends connected, the opposite handle-bars supported by the beams and extending upward and rearward therefrom, the opposite bearings, the axle, the ground-wheel thereon, and the miter gear, of the fertilizer hopper supported between the handle-bars above the beams and having its bottom provided with a longitudinal feed-slot having ways, a sliding cut-off arranged in the slot, a conical discharge passage arranged below and communicating with the slot and having its rear lower side provided with a V-shaped opening, a transverse yoke arranged in rear of the passage, a bearing-bracket arranged in front of the hopper, a feed-shaft journaled in the yoke and bracket and passing axially through the discharge passage, a feed-screw mounted on the feed-shaft within the passage and tapered in conformity therewith, an agitator shaft journaled in the hopper, sprocket-wheels on the feed-shaft and the agitator shaft, and an endless sprocket-chain connecting the two wheels, substantially as specified.

2. In a fertilizer distributer, the combination with the opposite beams having their rear ends terminating in journal-carrying standards, the opposite bearings, the axle arranged therein, the ground wheel supported by the axle, the miter gear arranged upon the axle, the opposite handle-bars secured to the beams and rising therefrom, and the yoke-bar connecting said beams in rear of the wheel, of the inclined hopper supported between the handle-bars and above the beams and between the yoke-bar and wheel, a tapered discharge passage arranged under the hopper and having a slot in its upper side conforming to that in the bottom of the hopper, a sliding cut-off arranged over the slot, a bearing bracket secured to one of the beams and having a bearing aligning with that in the yoke, a feed-shaft arranged in the bearings of the yoke and bracket, a miter gear at the front end of the shaft engaging with that of the axle, a tapered feed-screw arranged in the passage and upon the shaft, an agitator shaft journaled in the hopper and extending in rear of the same, sprocket-wheels on the feed-shaft and agitator shaft, and a sprocket-chain connecting the two, substantially as specified.

In testimony that I claim the foregoing as my own I have hereto affixed my signature in the presence of two witnesses.

JOHN BLUE.

Witnesses:
T. C. EVERETT,
F. T. BIZZELL.